United States Patent
Walz

(10) Patent No.: US 11,261,841 B2
(45) Date of Patent: Mar. 1, 2022

(54) HYDROSTATIC AXIAL PISTON MACHINE WITH THROUGH DRIVE

(71) Applicant: Robert Bosch GmbH, Stuttgart (DE)

(72) Inventor: Christoph Walz, Schopfloch (DE)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 16/792,516

(22) Filed: Feb. 17, 2020

(65) Prior Publication Data

US 2020/0325936 A1 Oct. 15, 2020

(30) Foreign Application Priority Data

Apr. 10, 2019 (DE) ...................... 10 2019 205 142.1

(51) Int. Cl.
| *F03C 1/06* | (2006.01) |
| *F01B 3/00* | (2006.01) |
| *F04B 1/324* | (2020.01) |

(52) U.S. Cl.
CPC .......... *F03C 1/0636* (2013.01); *F01B 3/0073* (2013.01); *F03C 1/06* (2013.01); *F04B 1/324* (2013.01)

(58) Field of Classification Search
None
See application file for complete search history.

(56) References Cited

U.S. PATENT DOCUMENTS

| 3,191,543 | A | 6/1965 | Hann et al. | |
| 3,678,804 | A * | 7/1972 | Heyl | F01B 3/0041 |
| | | | | 91/507 |
| 6,880,450 | B2 * | 4/2005 | Stolzer | F01B 3/0041 |
| | | | | 91/506 |
| 8,302,525 | B2 | 11/2012 | Eguchi et al. | |
| 10,954,936 | B2 * | 3/2021 | Apperger | F04B 1/20 |

(Continued)

FOREIGN PATENT DOCUMENTS

| DE | 1 022 490 B | 1/1958 |
| DE | 1 945 434 A1 | 3/1971 |

(Continued)

OTHER PUBLICATIONS

Bosch Rexroth AG, "Axial piston variable pumps A10VO, A10VSO, A10VSNO Series 32 Instruction Manual Re 92714-01-B/04.2018," 2018 (60 pages).

*Primary Examiner* — Michael Leslie
(74) *Attorney, Agent, or Firm* — Maginot, Moore & Beck LLP

(57) ABSTRACT

A hydrostatic axial piston machine has a drive shaft penetrating a housing on either side. In this case, the mechanically weaker of the two shaft ends is strengthened by an undercut being eliminated, said undercut defining the minimum diameter of the shaft end and thus of the entire drive shaft. Instead, the strength of the relevant shaft end is increased by a displacement of a circular bearing surface for a rolling bearing radially outwardly and away from the rolling bearing. In this case, the circular bearing surface is displaced below a compression spring which clamps the cylinder drum against a distributor plate. The resulting spacing between the circular bearing surface and the rolling bearing remaining in place is bridged by a sleeve or by a ring. A concave rounded shaft shoulder is simply formed below the sleeve and/or the ring.

9 Claims, 2 Drawing Sheets

(56) References Cited

U.S. PATENT DOCUMENTS

| | | | |
|---|---|---|---|
| 11,022,105 B2* | 6/2021 | Kane | F04B 1/2064 |
| 11,066,932 B2* | 7/2021 | Hoffmann | F04B 1/20 |
| 2020/0355171 A1* | 11/2020 | Wohlhauser | F04B 53/16 |

FOREIGN PATENT DOCUMENTS

| | | |
|---|---|---|
| DE | 202 14 801 U1 | 1/2003 |
| DE | 10022490 B4 | 4/2008 |
| EP | 1 691 110 B1 | 1/2010 |

* cited by examiner

HYDROSTATIC AXIAL PISTON MACHINE WITH THROUGH DRIVE

This application claims priority under 35 U.S.C. § 119 to patent application no. DE 10 2019 205 142.1, filed on Apr. 10, 2019 in Germany, the disclosure of which is incorporated herein by reference in its entirety.

The disclosure relates to a hydrostatic axial piston machine of swashplate design with through drive, i.e. with a drive shaft which may be coupled on either side.

BACKGROUND

In axial piston machines of swashplate design, it is usual that the drive shaft thereof is mounted on either side in the housing via one respective rolling bearing. In this case, the drive shaft generally only protrudes from the housing on the side of its swashplate and has a coupling means at that point, for example a feather key groove. For example, in the case of an axial piston pump the shaft of an electric motor may be coupled fixedly in terms of rotation onto this drive shaft end, in order to drive the axial piston pump in this manner. The opposing drive shaft end in this case is entirely received in the housing or in the connecting plate thereof.

It is also known to design the second drive shaft end, which may also be denoted as the end on the distributor plate side, with a coupling means for a shaft of a further machine, for which purpose the drive shaft also penetrates the housing in a sealed manner on a second side. Such axial piston machines are able to be used in many different ways.

The publication "Axial piston variable pump A10VO, A10VSO, A10VSNO, series 32, instruction manual RD92714-01-B" of the Applicant of April 2018 discloses such axial piston machines.

A drawback with the last-mentioned axial piston machines is that the second shaft end is designed to be thinner than the first shaft end and thus is able to transmit less torque at the second shaft end than at the first shaft end.

Moreover, the second shaft end has a weakening relative to deflection and torque due to an undercut which is configured on the internal periphery of an annular bearing surface. This annular bearing surface serves as a radial bearing portion for the rolling bearing at that point, so that the drive shaft may be supported via the annular bearing surface and via the rolling bearing on the housing and/or on the connecting plate thereof.

SUMMARY

Relative thereto the object of the disclosure is to provide an axial piston machine with through drive, the drive shaft thereof being able to transmit a greater torque on its second side relative to the prior art.

This object is achieved by an axial piston machine having the features disclosed herein.

The disclosed hydrostatic axial piston machine has a drive shaft, wherein, on the one hand, a non-rotating swashplate is arranged and, on the other hand, a cylinder drum is coupled fixedly in terms of rotation on an external periphery of a central region of the drive shaft. Pistons which are coupled to the swashplate are guided in the cylinder drum. A compression spring is arranged between the drive shaft, in particular the central region, and the cylinder drum, via which compression spring the cylinder drum is clamped against a distributor plate. A first rolling bearing and a first coupling device are provided on an end portion of the drive shaft on the swashplate side, whilst a second rolling bearing and a second coupling device are provided on an end portion of the drive shaft on the distributor plate side. An annular bearing surface is formed on the drive shaft, in particular between the central region and the end portion on the distributor plate side, by which bearing surface the drive shaft is supported via a ring or via a sleeve on the second rolling bearing. A shaft shoulder is formed between the annular bearing surface and the second rolling bearing, said shaft shoulder producing a reduction in the diameter of the drive shaft, viewed in the direction from the central region to the end portion on the distributor plate side. According to the disclosure, this shaft shoulder has the shape of a concave rounded portion, the radius thereof being significantly larger than that of the undercut of the prior art. Moreover, the rounded portion on the drive shaft is located further radially outwardly than the undercut of the prior art. Moreover, according to the disclosure, the annular bearing surface is arranged in the interior of the compression spring and the rounded portion is arranged in the interior of the sleeve or the ring. Thus the notch effect of the undercut is eliminated and the end portion of the drive shaft on the distributor plate side may be designed to be thicker than in the prior art. The torque which may be transmitted via the end portion of the drive shaft on the distributor plate side is increased thereby.

In the case of an axial piston pump this increased torque is a drive torque which is introduced by a motor via the second coupling device into the axial piston pump and has to be transmitted from the drive shaft to the cylinder drum. In the case of an axial piston motor, the increased torque is an output torque which has to be transmitted from the cylinder drum via the drive shaft to the second coupling device.

Preferably, the second rolling bearing is a conical rolling bearing, the sleeve or the ring being supported on the internal bearing race thereof.

It is particularly preferred if the end portion on the distributor plate side continuously or tangentially transitions into the rounded portion. Then preferably a circular cylindrical portion, which is encompassed by the second rolling bearing, continuously or tangentially transitions into the rounded portion.

If the ring or the sleeve has an external diameter which corresponds to the internal diameter of the compression spring, the ring or the sleeve may be an internal bearing portion for the compression spring—in particular for its end portion on the distributor plate side. Thus the drive shaft may have a maximum thickness and absorb and/or transmit a further increased torque on the end portion on the distributor plate side.

Alternatively or additionally, it is preferred if a preferably circular cylindrical portion of the drive shaft extends from the annular bearing surface in the direction of the central region of the drive shaft, the external diameter of said circular cylindrical portion corresponding to the internal diameter of the compression spring. Thus this portion may be an internal bearing portion for the compression spring— in particular for its end portion on the distributor plate side. Also in this embodiment the drive shaft may have a maximum thickness and absorb and/or transmit a further increased torque on the end portion on the distributor plate side.

In a first exemplary embodiment, a preferably circular cylindrical bearing portion for the sleeve is formed between the annular bearing surface and the rounded portion on the drive shaft, the sleeve being radially retained by said circular cylindrical bearing portion. In this case, the sleeve extends axially from the annular bearing surface via the bearing portion and via the rounded portion to the second rolling bearing.

Preferably, an undercut is formed between the annular bearing surface and the bearing portion of the first exemplary embodiment. Thus the undercut of the prior art which weakens the drive shaft is advantageously displaced into a region of larger diameter of the drive shaft since the bearing portion is located further radially outward than the circular cylindrical portion which is encompassed by the second rolling bearing.

In a second exemplary embodiment, just one reduction in diameter in the form of just one rounded portion is configured between the annular bearing surface and the second rolling bearing.

If the rounded portion continuously or tangentially transitions into the annular bearing surface, the drive shaft may absorb and/or transmit a further increased torque on the end portion on the distributor plate side.

In order to provide space for the rounded portion, and at the same time to permit a flat axial bearing portion of the sleeve relative to the annular bearing surface and a radial bearing portion over the entire periphery relative to the drive shaft, in particular relative to the end portion on the distributor plate side, it is preferred if the sleeve or the ring has a conical internal casing portion which is arranged on the external periphery of the rounded portion.

The axial piston machine may be an axial piston pump which is adjustable in terms of its swept volume.

BRIEF DESCRIPTION OF THE DRAWINGS

A plurality of exemplary embodiments of the axial piston pump according to the disclosure are shown in the figures. In the figures.

DETAILED DESCRIPTION

Figure 1:
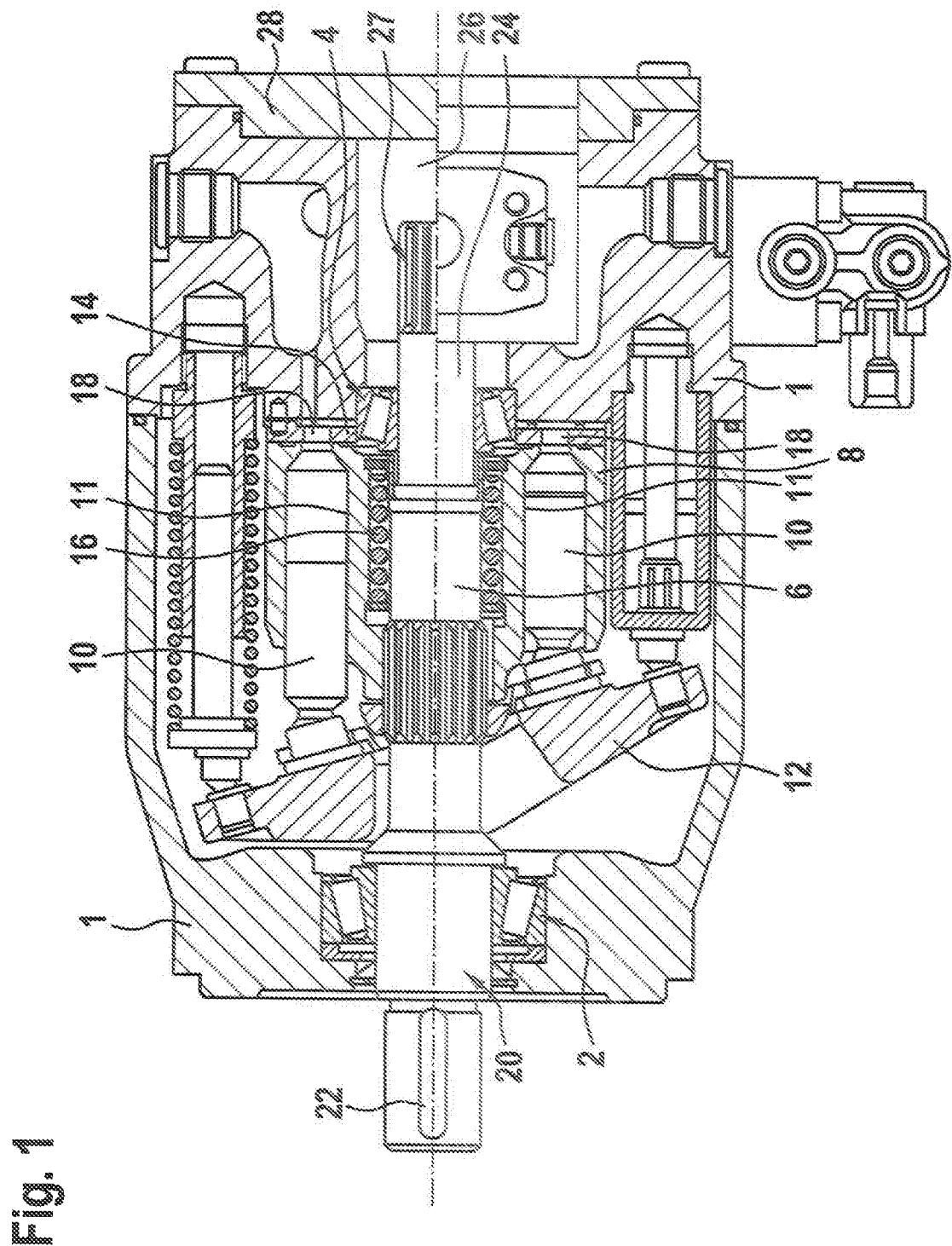
FIG. 1 shows in a longitudinal section the axial piston machine according to the disclosure according to a first exemplary embodiment.

FIG. 1 shows in a longitudinal section the axial piston machine according to the disclosure according to the first exemplary embodiment. In principle, in a manner known from the prior art, a drive shaft is mounted in a housing 1 and in the connecting plate thereof via a first rolling bearing 2 and via a second rolling bearing 4. The two rolling bearings 2, 4 are configured as conical rolling bearings, wherein the second conical rolling bearing 4 is smaller than the first conical rolling bearing 2.

The drive shaft has a central region 6, a cylinder drum 8 being coupled fixedly in terms of rotation thereto. In the cylinder drum 8, pistons 10 which are radially guided and uniformly distributed over the periphery are received in the respective cylinders 11, said cylinders being supported and guided on a swashplate 12. By adjusting the angle of the swashplate 12 a swept volume of the pistons 10 and thus of the axial piston machine may be altered.

A distributor plate 14 is arranged on a side of the cylinder drum 8 opposing the swashplate 12, wherein the cylinder drum 8 is clamped thereagainst via a compression spring 16.

During operation of the axial piston machine the cylinders 11 extend with their ports via respective kidney-shaped through-recesses 18 which are connected, on the one hand, to a high pressure connection and, on the other hand, to a low pressure connection of the connecting plate of the housing 1 of the axial piston machine.

Starting from the central region 6 of the drive shaft, an end portion 20 on the swashplate side extends through the first conical rolling bearing 2 and through the housing 1 and has a first coupling device 22 which is formed by a feather key groove.

On the other side (to the right in FIG. 1) an end portion 24 of the drive shaft on the distributor plate side extends through the distributor plate 14 and through the second conical rolling bearing 4 and has a second coupling device 27 which is formed by a shaft toothing. In this case the shaft toothing is arranged in a cavity 26 which is formed in the connection plate of the housing 1 and which is closed by a housing cover 28.

According to the disclosure, an increase in the mechanical strength of the end portion 24 of the drive shaft on the distributor plate side, which may only be used when the housing cover 28 is removed from the connecting plate of the housing 1 so that the second coupling device 27 is accessible and is subjected to torque, is described hereinafter.

Figure 2:
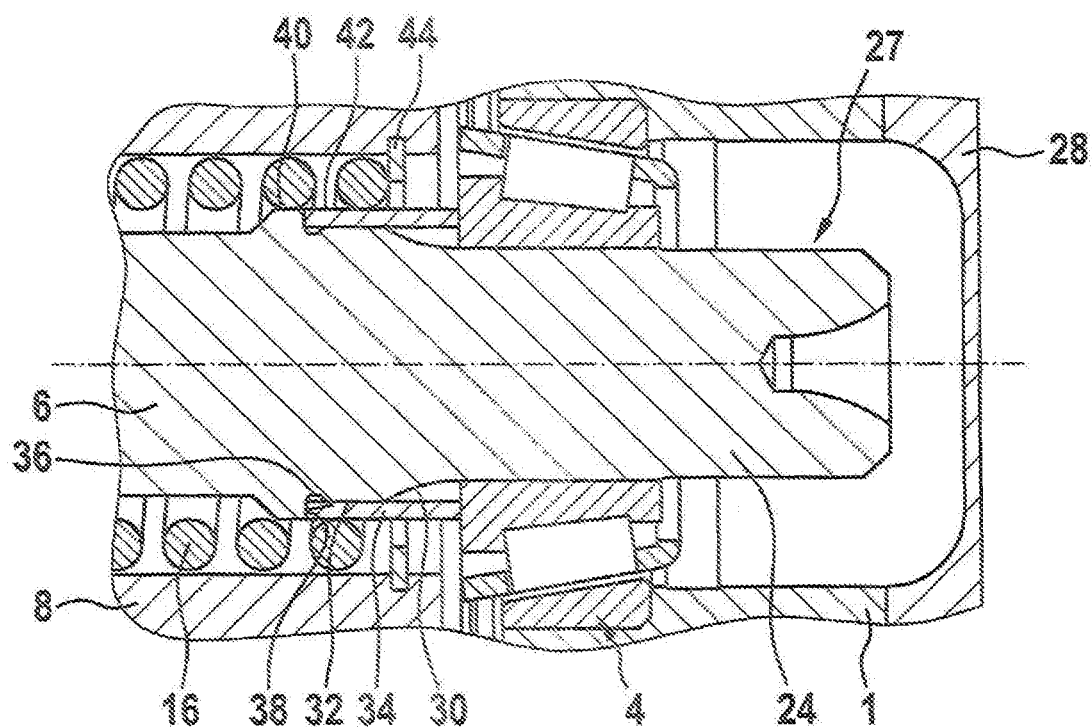
FIG. 2 shows a detail of the axial piston machine of FIG. 1

FIG. 2 shows a detail of FIG. 1, namely the central region 6 and the end portion 24 of the drive shaft on the distributor plate side and the surroundings thereof. An end portion of the compression spring 16 on the distributor plate side is arranged on the external periphery of the central region 6 of the drive shaft. An internal part of the cylinder drum 8 is shown on the external periphery of the compression spring 16.

The second conical rolling bearing 4 is arranged on the external periphery of the end portion 24 of the drive shaft on the distributor plate side, said second conical rolling bearing being supported with its external ring on the connecting plate of the housing 1.

A concave rounded portion 30 is formed on the external periphery of the drive shaft. Viewed from the end portion 24 in the direction of the central region 6 of the drive shaft (from right to left in FIG. 2), this rounded portion 30 is followed by a circular cylindrical bearing portion 32 for a sleeve 34. The circular cylindrical bearing portion 32 transitions via an undercut 36 into an annular bearing surface 38 which serves as an axial bearing portion for the sleeve 32. More specifically, the drive shaft is supported via its annular bearing surface 38 and via the sleeve 34 and via the second conical rolling bearing 4 on the connecting plate of the housing 1.

Moreover, viewed from the end portion 24 on the distributor plate side in the direction of the central region 6 of the drive shaft, the annular bearing surface 38 is followed by a relatively short circular cylindrical bearing portion 40 for the compression spring 16. An external diameter of the bearing portion 40 has the same diameter as an external casing 42 of the sleeve 34. This external casing 42 of the sleeve 34 may also serve as a bearing portion for the compression spring 16.

Via the compression spring 16 and via a locking ring or an adjusting washer 44, which is inserted into an internal periphery of the cylinder drum 8, this cylinder drum is axially clamped (to the right in FIG. 2) against the distributor plate 14 (shown in FIG. 1).

According to the disclosure, reductions in diameter and, in particular, an undercut are not provided between the central region 6 and the end portion 24 of the drive shaft, the internal diameter thereof being smaller than the diameter of the end portion 24. Thus the drive shaft with its end portion 24 is provided with a greater strength and via the second coupling device 27 provided on the end portion 24 may transmit a greater torque relative to the prior art.

Figure 3:
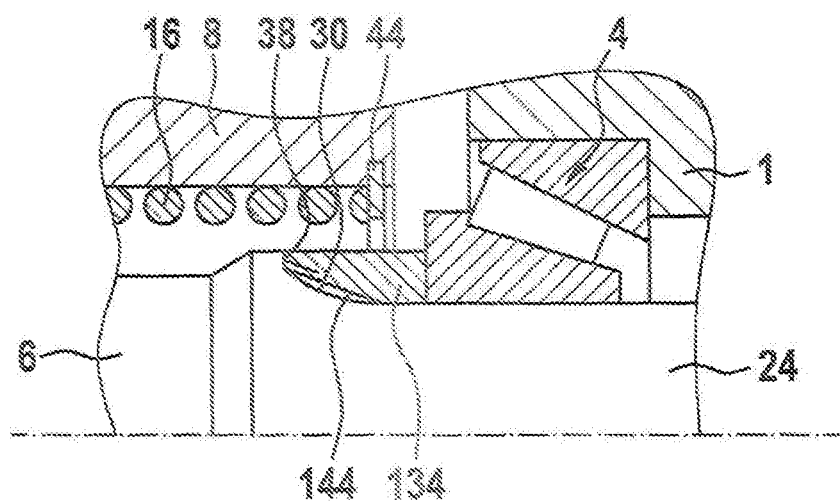
FIG. 3 shows a detail of a longitudinal section of the axial piston machine according to the disclosure according to a second exemplary embodiment.

FIG. 3 shows a second exemplary embodiment, deviating from the first exemplary embodiment according to FIGS. 1 and 2, of the mechanical strengthening according to the disclosure of the end portion 24 of the drive shaft on the distributor plate side.

In contrast to FIG. 2, in FIG. 3 the rounded portion 30 is configured on the end portion 24 on the distributor plate side such that, on the one hand, it transitions tangentially and/or continuously into the bearing portion for the internal ring of the second conical rolling bearing 4 and, on the other hand, tangentially and/or continuously into the annular bearing surface 38. The bearing portion 32 for the sleeve 34 is eliminated thereby. Thus a component which is axially shortened relative to the sleeve 34 of the first exemplary embodiment and which is designed as a ring 134 is sufficient. The ring 134 is clamped between the annular bearing surface 38 and the internal ring of the second conical rolling bearing 4. The ring 134 is retained in the radial direction via the bearing portion of the end portion 24, the internal ring of the second conical rolling bearing 4 also being pushed thereon.

In the second exemplary embodiment according to FIG. 3, therefore, the concave rounded portion 30 is located radially inside and/or below the ring 134. Thus the ring 134 has a conical internal casing portion 144 in order to provide space for the rounded portion 30.

Also deviating from the first exemplary embodiment according to FIG. 2, the compression spring 16 is designed with a slightly larger diameter so that it does not bear internally against the drive shaft and against the sleeve 34 and/or the ring 134 but bears, and thus is guided and retained, with its external periphery against an internal periphery of the cylinder drum 8.

Disclosed is a hydrostatic axial piston machine, the drive shaft thereof penetrating a housing 1 on either side. In this case, the mechanically weaker of the two shaft ends 24 is strengthened by an undercut (of the prior art) being eliminated, said undercut defining the minimum diameter of the shaft end 24 and thus of the entire drive shaft. Instead, the strength of the relevant shaft end 24 is increased by a displacement of a circular bearing surface 38 for a rolling bearing 4 radially outwardly and away from the rolling bearing 4. In this case, the circular bearing surface is displaced below a compression spring 16 which clamps the cylinder drum 8 against a distributor plate 14. The resulting spacing between the circular bearing surface 38 and the rolling bearing 4 remaining in place is bridged by a sleeve 34 or by a ring 134. A concave rounded shaft shoulder 30 is simply formed below the sleeve 34 and/or the ring 134.

LIST OF REFERENCE NUMERALS

1 Housing with connecting plate
2 First rolling bearing/first conical rolling bearing
4 Second rolling bearing/second conical rolling bearing
6 Central region
8 Cylinder drum
10 Piston
11 Cylinder
12 Swashplate
14 Distributor plate
16 Compression spring
18 Kidney-shaped through-recess
20 End portion on swashplate side
22 First coupling device/feather key groove
24 End portion on distributor plate side
26 Cavity
27 Second coupling device/shaft toothing
28 Housing cover
30 Concave rounded portion
32 Bearing portion
34 Sleeve
36 Undercut
38 Annular bearing surface
40 Bearing portion
42 External casing
44 Adjusting washer
134 Ring
144 Conical internal casing portion

The invention claimed is:

1. A hydrostatic axial piston machine, comprising:
a drive shaft having a central region with an external periphery, the drive shaft having an annular bearing surface formed on the drive shaft;
a swashplate arranged on the external periphery;
a cylinder drum coupled fixedly in terms of rotation on the external periphery;
a distributor plate;
a compression spring arranged between the drive shaft and the cylinder drum, the compression spring configured to clamp the cylinder drum against the distributor plate;
a first rolling bearing and a first coupling device arranged on a first end portion of the drive shaft on a side of the drive shaft toward the swashplate;
a second rolling bearing and a second coupling device arranged on a second end portion of the drive shaft, which is on a side of the drive shaft toward the distributor plate; and
a sleeve or ring supporting the drive shaft on the second rolling bearing via the annular bearing surface,
wherein the annular bearing surface is arranged in an interior of the compression spring, and
wherein a shaft shoulder configured as a concave rounded portion is arranged between the annular bearing surface and the second rolling bearing, said rounded portion being arranged in an interior of the sleeve or ring.

2. The axial piston machine according to claim 1, wherein the second end portion of the drive shaft continuously transitions into the rounded portion of the drive shaft.

3. The axial piston machine according to claim 1, wherein the sleeve or ring has an external casing configured as a bearing portion for the compression spring.

4. The axial piston machine according to claim 1, wherein a portion of the drive shaft extends from the annular bearing surface in a direction of the central region, said portion of the drive shaft being a bearing portion for the compression spring.

5. The axial piston machine according to claim 1, wherein:
the drive shaft includes a bearing portion for the sleeve formed between the annular bearing surface and the rounded portion on the drive shaft, and
the sleeve extends from the annular bearing surface via the bearing portion and via the rounded portion to the second rolling bearing.

6. The axial piston machine according to claim 5, wherein an undercut is formed between the annular bearing surface and the bearing portion.

7. The axial piston machine according to claim 1, wherein the drive shaft includes just one reduction in diameter in the form of just one rounded portion defined between the annular bearing surface and the second rolling bearing.

8. The axial piston machine according to claim 7, wherein the rounded portion continuously transitions into the annular bearing surface.

9. The axial piston machine according to claim 7, wherein the sleeve or ring has a conical internal casing portion arranged on the external periphery of the rounded portion.

* * * * *